US012698859B1

(12) United States Patent
Roesner et al.

(10) Patent No.: US 12,698,859 B1
(45) Date of Patent: Aug. 4, 2026

(54) SEAL CARRIER TOOL SYSTEMS AND METHODS

(71) Applicant: Scout Surface Solutions, LLC, Joshua, TX (US)

(72) Inventors: Thomas George Roesner, Cypress, TX (US); David Lane Evans, Conroe, TX (US); John Andrew Chappell, Katy, TX (US)

(73) Assignee: Scout Surface Solutions, LLC, Joshua, TX (US)

( * ) Notice: Subject to any disclaimer, the term of this patent is extended or adjusted under 35 U.S.C. 154(b) by 0 days.

(21) Appl. No.: 19/344,235

(22) Filed: Sep. 29, 2025

(51) Int. Cl.
| | |
|---|---|
| *F16L 37/42* | (2006.01) |
| *B25B 27/00* | (2006.01) |
| *F01D 11/00* | (2006.01) |
| *F16L 37/62* | (2006.01) |

(52) U.S. Cl.
CPC .......... *F16L 37/42* (2013.01); *B25B 27/0028* (2013.01); *F01D 11/003* (2013.01); *F16L 37/62* (2013.01)

(58) Field of Classification Search
CPC . F16L 37/42; F16L 37/40; F16L 37/38; F16L 37/28; F16L 37/00; F16L 37/62; B25B 27/0028; B25B 27/00; F01D 11/003
USPC ........................ 29/523, 522.1, 505, 428, 592
See application file for complete search history.

(56) References Cited

U.S. PATENT DOCUMENTS

| | | | | |
|---|---|---|---|---|
| 6,237,207 | B1* | 5/2001 | Vom Stein .............. | F02F 7/006 |
| | | | | 269/900 |
| 2008/0264690 | A1* | 10/2008 | Khan ....................... | E21B 21/08 |
| | | | | 175/25 |
| 2009/0200793 | A1* | 8/2009 | Smith, III ........... | F16J 15/3276 |
| | | | | 285/111 |
| 2013/0000989 | A1* | 1/2013 | Sherrill ................... | E21B 49/10 |
| | | | | 29/428 |
| 2013/0026394 | A1* | 1/2013 | Yadav ................... | E21B 33/062 |
| | | | | 251/1.3 |
| 2017/0254461 | A1* | 9/2017 | Smith, III ........... | F16J 15/3268 |
| 2020/0182006 | A1* | 6/2020 | Dietrich ................ | E21B 33/085 |
| 2021/0168519 | A1* | 6/2021 | Davis ................... | H04R 1/1041 |
| 2023/0175589 | A1* | 6/2023 | Cigal ................... | F01D 11/003 |
| | | | | 277/379 |
| 2023/0235678 | A1* | 7/2023 | Schwendenmann ........................ | |
| | | | | F01D 11/003 |
| | | | | 277/399 |

* cited by examiner

*Primary Examiner* — Lawrence Averick
(74) *Attorney, Agent, or Firm* — Fletcher Yoder, P.C.

(57) ABSTRACT
A system includes a seal carrier tool. The seal carrier tool includes an inner portion configured to engage a seal carrier assembly. The seal carrier assembly is configured to removably engage with a portion of a borehole of a connector of a fluid supply system. The seal carrier tool also includes an outer portion disposed radially outward from the inner portion. The outer portion is configured to engage the connector. The seal carrier tool also includes an actuator configured to engage both the inner portion and the outer portion. The actuator is configured to drive the inner portion to move in an axial direction relative to the outer portion to facilitate removal of the seal carrier assembly from the portion of the borehole.

20 Claims, 9 Drawing Sheets

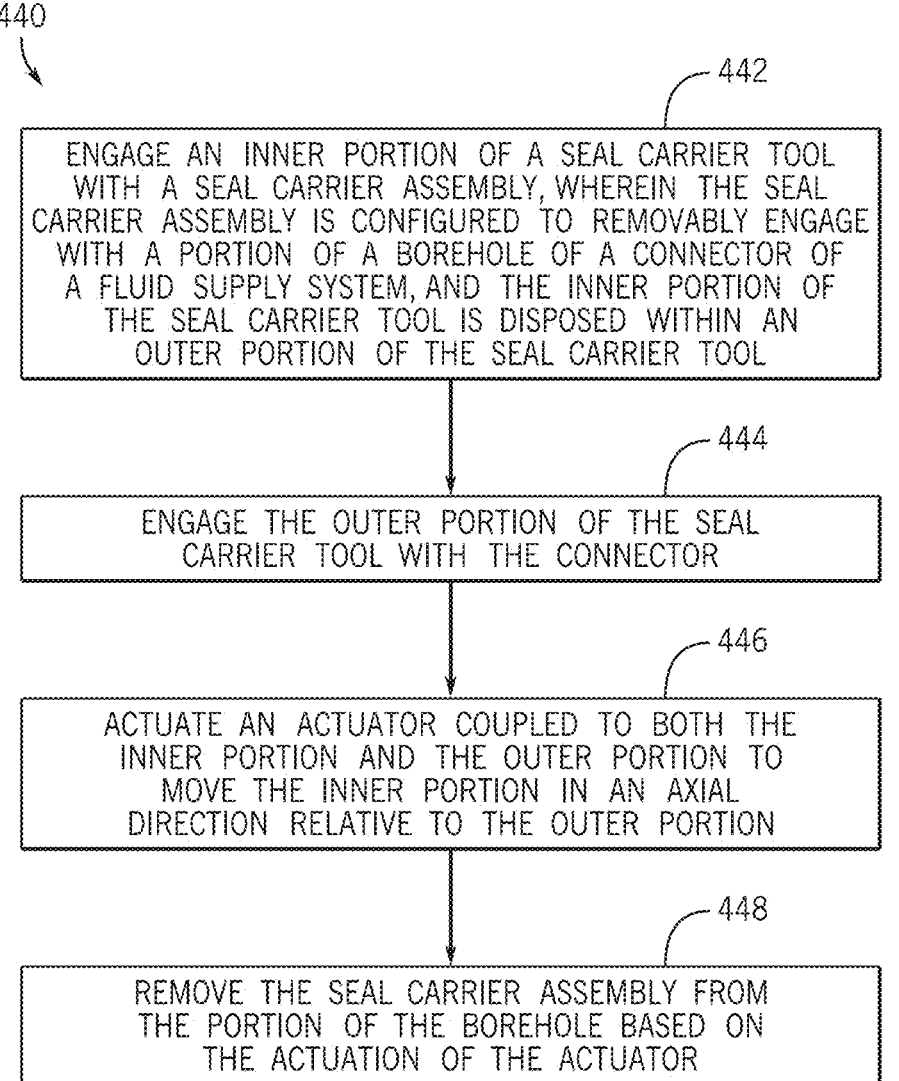

440

442

ENGAGE AN INNER PORTION OF A SEAL CARRIER TOOL WITH A SEAL CARRIER ASSEMBLY, WHEREIN THE SEAL CARRIER ASSEMBLY IS CONFIGURED TO REMOVABLY ENGAGE WITH A PORTION OF A BOREHOLE OF A CONNECTOR OF A FLUID SUPPLY SYSTEM, AND THE INNER PORTION OF THE SEAL CARRIER TOOL IS DISPOSED WITHIN AN OUTER PORTION OF THE SEAL CARRIER TOOL

444

ENGAGE THE OUTER PORTION OF THE SEAL CARRIER TOOL WITH THE CONNECTOR

446

ACTUATE AN ACTUATOR COUPLED TO BOTH THE INNER PORTION AND THE OUTER PORTION TO MOVE THE INNER PORTION IN AN AXIAL DIRECTION RELATIVE TO THE OUTER PORTION

448

REMOVE THE SEAL CARRIER ASSEMBLY FROM THE PORTION OF THE BOREHOLE BASED ON THE ACTUATION OF THE ACTUATOR

FIG. 9

SEAL CARRIER TOOL SYSTEMS AND METHODS

BACKGROUND

The present disclosure relates generally to systems and methods for servicing a seal carrier assembly of a fluid supply system.

Various resources (e.g., hydrocarbon gas, oil, etc.) may be extracted from subterranean formations by drilling wells into the subterranean formations. During production, one or more resources may flow from the subterranean formation to a wellhead via the well. The wellhead may include components (e.g., valves, connectors, etc.) configured to control flow of the one or more resources to storage and/or processing assemblies.

For a subterranean formation having low porosity and/or low permeability, and/or when flow of the one or more resources from a subterranean formation decreases, a well stimulation system may be employed to perform a well stimulation operation to fracture the subterranean formation, thereby increasing the flow of the one or more resources from the subterranean formation. The well stimulation system typically includes a fluid supply system. The fluid supply system includes one or more connectors for distributing fluid (e.g., fracturing fluid) to and/or from one or more lines (e.g., hoses, conduits, etc.) having one or more respective additional connectors. A seal carrier assembly, which provides a seal between a connector and an additional connector of a corresponding line, is removably coupled to both the connector and the additional connector. The seal carrier assembly and/or components of the seal carrier assembly may be replaced after a duration of time due to wear on the seals and may be removed for inspection of the seals, the seal carrier, and/or the connectors. Unfortunately, the seal carrier may be difficult to remove from the connector due to accumulation of material contained within the fluid, a tight fit of the seal within the connector, and/or trapped air.

BRIEF DESCRIPTION

In certain embodiments, a system includes a seal carrier tool. The seal carrier tool includes an inner portion configured to engage a seal carrier assembly. The seal carrier assembly is configured to removably engage with a portion of a borehole of a connector of a fluid supply system. The seal carrier tool also includes an outer portion disposed radially outward from the inner portion. The outer portion is configured to engage the connector. The seal carrier tool also includes an actuator configured to engage both the inner portion and the outer portion. The actuator is configured to drive the inner portion to move in an axial direction relative to the outer portion to facilitate removal of the seal carrier assembly from the portion of the borehole.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein:

FIG. 9 is a flowchart of an example process of operating the seal carrier tool of FIGS. 2-4.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments.

The present disclosure is directed to a seal carrier tool for removing a seal carrier assembly of a fluid supply system, which is used for delivering a fluid (e.g., fracturing fluid, water, etc.), from a borehole. The seal carrier tool includes an inner disk disposed within an outer sleeve. The seal carrier tool also includes an actuator engaged with both the inner disk and the outer sleeve. The outer sleeve is configured to engage an axially facing surface of a connector having the borehole, and the inner disk is configured to engage a portion of the seal carrier assembly. Based on an actuation of the actuator, the actuator is configured to cause the inner portion to move in an axial direction relative to the outer sleeve, thereby removing the seal carrier assembly from the borehole. Additional embodiments of the seal carrier tool disclosed herein include a plate that is disposed about a portion of the seal carrier assembly and axially adjacent to the connector. The plate is engaged with the seal carrier assembly and includes one or more threaded holes. One or more threaded rods (e.g., bolts) may be threaded through the one or more threaded holes, such that the threaded rods press against the axially facing surface of the connector. As the threaded rods press against the connector, the plate moves in an axial direction away from the connector, thereby removing the seal carrier assembly from the borehole of the connector. In certain embodiments, the plate may include multiple plate segments.

Figure 1:
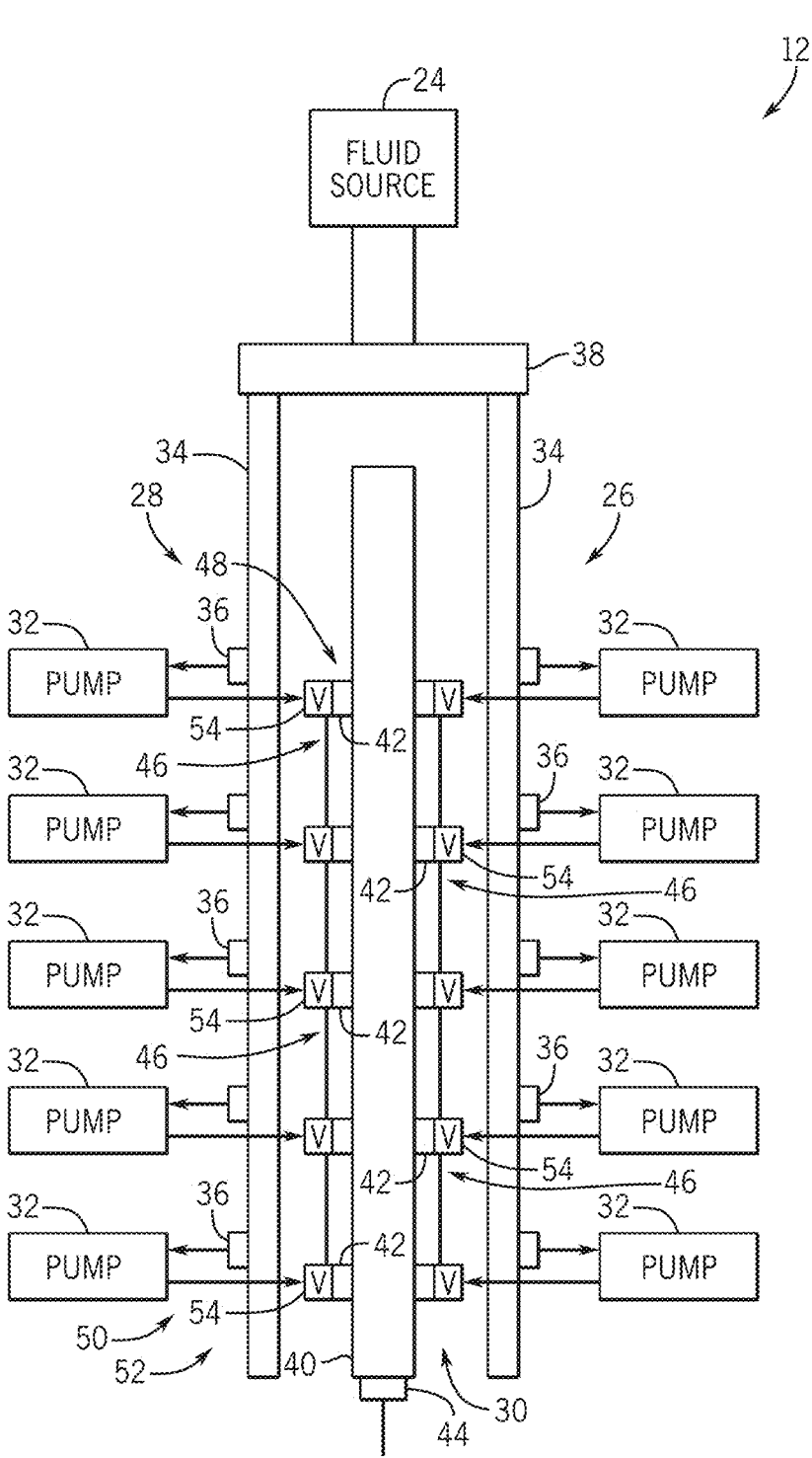
FIG. 1 is a block diagram of an embodiment of a fluid supply system including a seal carrier assembly.

FIG. 1 is a block diagram of an embodiment of a well stimulation fluid supply system 12. In the illustrated embodiment, the well stimulation fluid supply system 12 includes a fluid source 24. The fluid source 24 is configured to output low-pressure fluid (e.g., low-pressure fracturing fluid). The fracturing fluid may include water and proppant (e.g., sand, ceramic particles, etc.). The fracturing fluid may also include one or more chemical additives (e.g., acid, etc.). In certain embodiments, the fluid source 24 includes a water source that may include one or more water tanks, one or more ponds, one or more pumps, other suitable component (s), or a combination thereof. In addition, in certain embodiments, the fluid source 24 includes a blending unit configured to blend the water with the proppant and/or the chemical additives to form the low-pressure fracturing fluid. The blending unit may also include one or more pumps configured to pump the fracturing fluid to the fluid conduit assembly.

In addition, the well stimulation fluid supply system 12 includes a fluid conduit assembly 26 having a low-pressure conduit assembly 28 and a high-pressure monobore conduit assembly 30. The well stimulation fluid supply system 12 also includes multiple fluid pumps 32. The low-pressure conduit assembly 28 is configured to receive the low-pressure fluid (e.g., low-pressure fracturing fluid) from the fluid source 24 and to output the low-pressure fluid to the fluid pumps 32, and the high-pressure monobore conduit assembly 30 is configured to receive the high-pressure fluid (e.g., high-pressure fracturing fluid) from the fluid pumps 32. As previously discussed, each fluid pump 32 is configured to receive the low-pressure fluid, to substantially increase the pressure of the fluid, and to output the high-pressure fluid. In certain embodiments, one or more fluid pumps may be mounted on truck(s), and each truck may position the respective fluid pump(s) at a location suitable for interfacing with the fluid conduit assembly 26. While the well stimulation fluid supply system includes ten fluid pumps in the illustrated embodiment, in other embodiments, the well stimulation fluid supply system may include more or fewer fluid pumps (e.g., 2, 3, 4, 5, 6, 7, 8, 9, 11, 12, etc.).

In the illustrated embodiment, the low-pressure conduit assembly 28 includes low-pressure conduits 34 and low-pressure outlets 36. In addition, the well stimulation fluid supply system 12 includes a manifold 38 configured to direct the low-pressure fluid (e.g., low-pressure fracturing fluid) from the fluid source 24 to the low-pressure conduits 34. For example, the manifold 38 may receive the low-pressure fluid from the fluid source 24 via respective hose(s) and/or pipe(s) (e.g., steel pipe(s), etc.). In addition, the low-pressure outlets 36 are configured to direct the low-pressure fluid from the low-pressure conduits 34 to the fluid pumps 32. For example, the low-pressure outlets 36 may output the low-pressure fluid to the fluid pumps 32 via respective hoses. While the low-pressure conduit assembly 28 includes two low-pressure conduits 34 in the illustrated embodiment, in other embodiments, the low-pressure conduit assembly may include more or fewer conduits (e.g., 1, 3, 4, or more). For example, in certain embodiments, the low-pressure conduit assembly may include a single monobore low-pressure conduit. In such embodiments, the manifold may be reconfigured or omitted.

Furthermore, in the illustrated embodiment, the high-pressure monobore conduit assembly 30 includes a high-pressure monobore conduit 40, high-pressure inlets 42, and a high-pressure outlet 44. The high-pressure inlets 42 are configured to direct the high-pressure fluid (e.g., high-pressure fracturing fluid) from the fluid pumps 32 to the high-pressure monobore conduit 40. As used herein, "monobore conduit" refers to a single respective longitudinal conduit within the fluid conduit assembly, as compared to a multi-bore conduit assembly having two or more longitudinal conduits (e.g., fluidly coupled to one another, such as via u-shaped tube(s), etc.). Accordingly, in the illustrated embodiment, the fluid conduit assembly includes a single high-pressure conduit. However, in other embodiments, the high-pressure conduit assembly may include multiple high-pressure conduits (e.g., 2, 3, 4, or more).

In the illustrated embodiment, the high-pressure inlet 42 includes a connector 46 having a seal carrier assembly 48 configured to provide a seal between the high-pressure inlet 42 and a line (e.g., hose, conduit, etc.) coupled to the high-pressure inlet 42. Although the connector 46 and the seal carrier assembly 48 are associated with the high-pressure inlet 42 in the illustrated embodiment, the connector 46 and/or the seal carrier assembly 48 may be used elsewhere in the well stimulation fluid supply system 12. For example, the connector 46 and/or the seal carrier assembly 48 may additionally or alternatively be used in one or more high-pressure outlets 44 and/or one or more low pressure outlets 36. The seal carrier assembly 48 is discussed in more detail herein. By further example, the seal carrier assembly 48 may be used to provide a seal between a hose and a check valve, a check valve and the high-pressure inlet 42, a hose and the high-pressure inlet 42, or a combination thereof. The seal carrier assembly 48 may be used to seal any suitable components of the well stimulation fluid supply system 12.

The well stimulation fluid supply system 12 includes connection assemblies 50 fluidly coupling the fluid pumps 32 to the high-pressure monobore conduit assembly 30. In the illustrated embodiment, each connection assembly 50 fluidly couples a respective fluid pump 32 to a respective high-pressure inlet 42, thereby enabling the high-pressure fluid to flow from the respective fluid pump 32 through the respective high-pressure inlet 42 to the high-pressure monobore conduit 40. Furthermore, the well stimulation fluid supply system 12 includes a valve assembly 52 having multiple valves 54. Each valve 54 is disposed along a respective connection assembly 50 (e.g., along a conduit assembly extending between the respective fluid pump 32 and the respective high-pressure inlet 42, between the respective high-pressure inlet 42 and a conduit, between the respective fluid pump 32 and a conduit, etc.). Accordingly, each valve 54 of the valve assembly 52 is fluidly disposed between the respective fluid pump 32 and the high-pressure monobore conduit 40. Furthermore, each valve 54 is configured to transition between an open position and a closed position. The valve 54 is configured to enable a flow of the high-pressure fluid from the respective fluid pump 32 to the high-pressure monobore conduit 40 via a respective high-pressure inlet 42 while in the open position, and the valve 54 is configured to block the flow of the high-pressure fluid from the high-pressure monobore conduit 40 to the respective fluid pump 32 while in the closed position.

Figure 2:
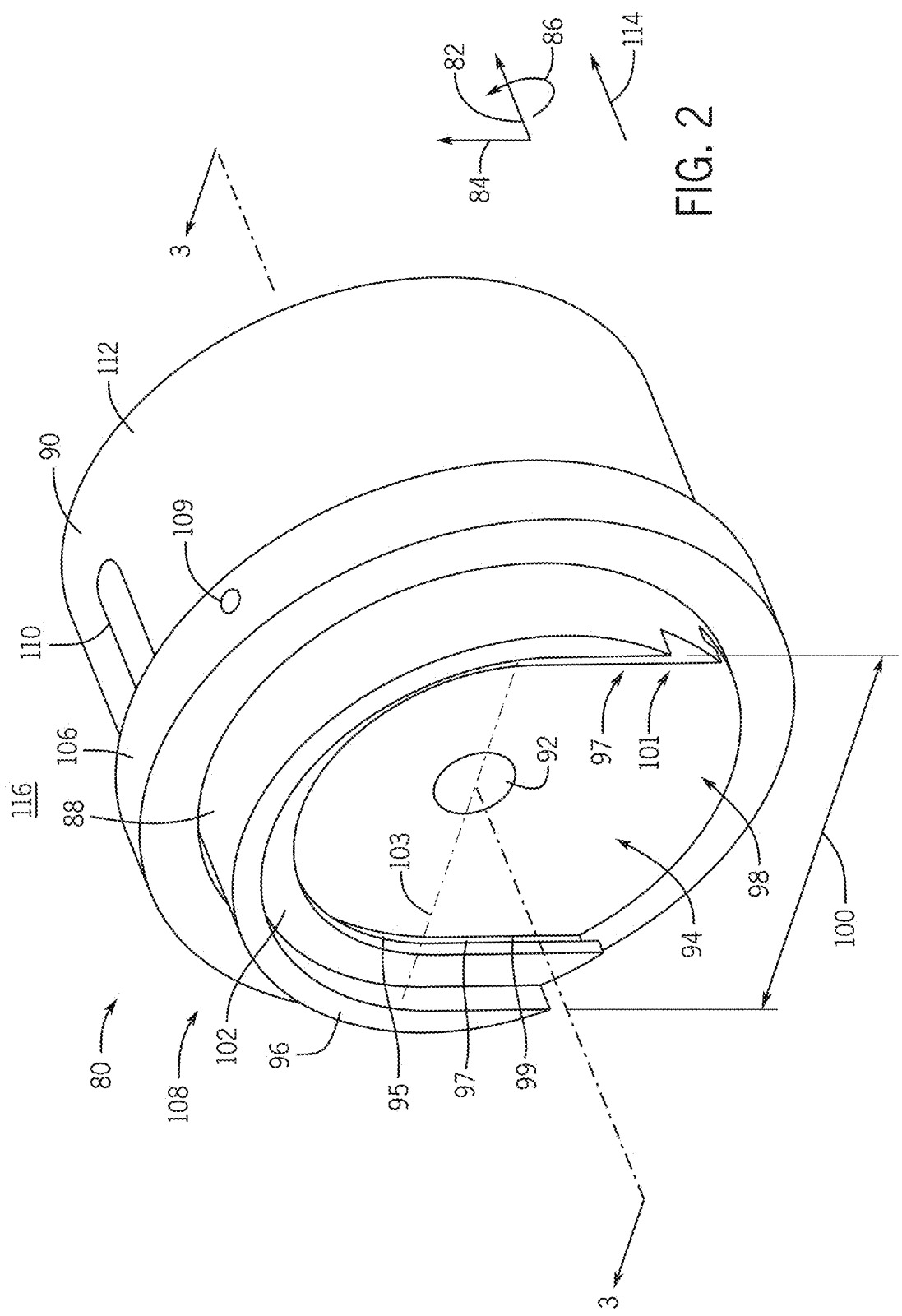
FIG. 2 is a perspective view of an embodiment of a seal carrier tool for servicing the seal carrier assembly of FIG. 1.

FIG. 2 is a perspective view of an embodiment of a seal carrier tool 80 for servicing the seal carrier assembly 48. The seal carrier tool 80 may be described in reference to an axial direction or axis 82, a radial direction or axis 84, and a circumferential direction or axis 86. In the illustrated embodiment, the seal carrier tool 80 includes an inner disk 88 (e.g., inner portion, inner disk portion, etc.) configured to engage the seal carrier assembly 48. The seal carrier tool 80 also includes an outer sleeve 90 (e.g., outer portion, outer sleeve portion, etc.) disposed radially outward from the inner disk 88. The seal carrier tool 80 also includes an actuator 92 engaged with (e.g., coupled to) the inner disk 88 and the outer sleeve 90. As described further herein, the inner disk 88 is configured to move axially relative to the outer sleeve 90 based on an actuation of the actuator 92 to facilitate removal (e.g., extraction) of the seal carrier assembly 48 from a portion of a borehole of the connector 46.

In the illustrated embodiment, the inner disk 88 includes a slot 94 at least partially defined by an inner radial surface 95 of a wall 96 of the inner disk 88 and aperture surfaces 97 (e.g., aperture surfaces 99, 101) of an aperture 98 (e.g., notch, opening, hole, etc.) formed radially through the wall 96. In certain embodiments, the aperture surfaces 97 may both substantially intersect a diameter 103 of the inner radial surface 95 and may be substantially tangent to the inner radial surface 95. A width 100 spanning between the aperture surfaces 97 of the aperture 98 is greater than a width of a portion of the seal carrier assembly 48. As shown, the inner disk 88 also includes a protrusion 102 disposed radially inward of the wall 96 and coupled to the inner radial surface 95 of the wall 96. The protrusion 102 extends about a circumferential extent of the wall 96. The aperture 98 is additionally formed through the protrusion 102. In certain embodiments, the protrusion 102 may include multiple separate protrusions circumferentially spaced apart from one another. The inner disk 88 is configured to engage (e.g., removably couple to) the seal carrier assembly 48 based on the protrusion 102 engaging a recess (e.g., groove) of the seal carrier assembly 48. In the illustrated embodiment, the inner disk 88 is a single piece. In certain embodiments, the inner disk may include multiple pieces that interlock or engage with each other. In certain embodiments, the seal carrier assembly 48 may engage the inner disk 88 based on an outward radial protrusion of the seal carrier assembly 48 engaging a recess of the inner disk 88.

In the illustrated embodiment, the seal carrier tool 80 includes a protective bushing 106 (e.g., thrust ring, bushing, etc.) coupled to the outer sleeve 90 and disposed about the inner disk 88. As shown, the protective bushing 106 is disposed at an axial end 108 of the outer sleeve 90. The protective bushing 106 is configured to directly contact the connector when the outer sleeve 90 engages the connector, thereby blocking the outer sleeve 90 from directly contacting the connector. In the illustrated embodiment, the protective bushing 106 extends about an entire circumferential extent of the outer sleeve 90. In certain embodiments, the protective bushing 106 may extend about a partial circumferential extent of the outer sleeve 90. For example, the protective bushing 106 may include multiple protective portions (e.g., protective pads, etc.) coupled to the axial end 108 of the outer sleeve 90. In certain embodiments, the protective bushing 106 may be detachable from the outer sleeve 90. Furthermore, the protective bushing 106 may include an annular layer (e.g., annular pad) axially disposed between the connector and the outer sleeve 90. In certain embodiments, the protective bushing 106 may be omitted. In the illustrated embodiment, the protective bushing 106 is removably coupled to the outer sleeve 90 via screws 109 (e.g., set screws, standard screws, etc.). In certain embodiments, the protective bushing 106 may be fixedly coupled to the outer sleeve 90 (e.g., epoxy, brazing, welding, etc.). In certain embodiments the protective bushing 106 may be composed of a metallic material (e.g., aluminum, bronze, brass, etc.), a non-metallic material (e.g., nylon), or a combination thereof.

In the illustrated embodiment, the outer sleeve 90 includes a slot 110 formed through a wall 112 of the outer sleeve 90. As shown, the slot 110 extends in an axial direction 114. The slot 110 is configured to provide visibility of a portion of the inner disk 88 from an exterior 116 of the seal carrier tool 80. For example, the slot 110 may provide visibility of the inner disk 88 to an operator as the inner disk 88, while engaged with the seal carrier assembly 48, moves in the axial direction 114 relative to the outer sleeve 90, thereby enabling the operator to see that the inner disk 88 is being properly extracted from the connector. In certain embodiments, the outer sleeve 90 may include multiple slots 110 circumferentially and/or axially spaced about the wall 112 of the outer sleeve 90. In certain embodiments, the slot 110 may be omitted.

Figure 3:
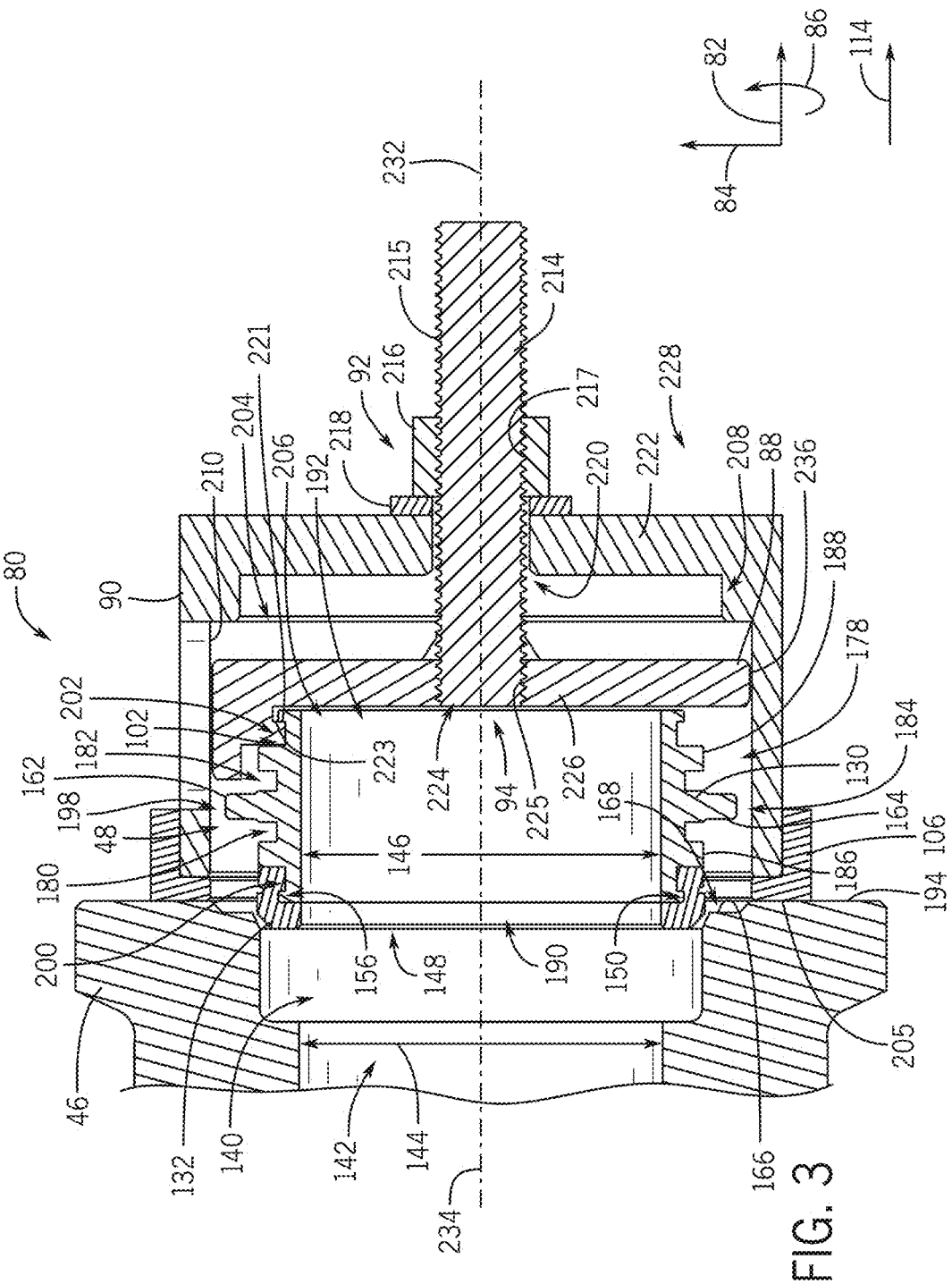
FIG. 3 is a cross-sectional side view of the seal carrier tool of FIG. 2, taken along line 3-3 in FIG. 2.

FIG. 3 is a cross-sectional side view of the seal carrier tool 80 of FIG. 2, taken along line 3-3 in FIG. 2. In the illustrated embodiment, the seal carrier assembly 48 includes a seal carrier 130 and a seal 132. As shown, the seal carrier assembly 48 is configured to be press fit within the counterbore portion 140 of a borehole 142 of the connector 46. As shown, an inner diameter 144 of the borehole 142 is substantially equal to an inner diameter 146 of the seal carrier assembly 48. In the illustrated embodiment, the seal 132 is disposed on an axial end portion 148 of the seal carrier assembly 48, and is configured to establish a seal between the connector 46 and the seal carrier 130. As shown, the seal 132 includes a channel 150 that engages a protrusion 156 of the seal carrier 130, thereby enabling the seal 132 to mate with (e.g., removably couple to) the seal carrier 130.

As shown, the seal carrier 130 includes a protrusion 162 (e.g., radial protrusion) that is axially centered along the seal carrier 130. An axially facing surface 164 of the protrusion 162 is configured to contact an axially facing surface 166 of a counterbore portion 168 of the borehole 142. In certain embodiments, the axially facing surface 164 may not contact the axially facing surface 166. The protrusion 162 may block excessive axial travel of the seal carrier assembly 48 into the counterbore portion 140 and may at least partially stabilize and/or align the seal carrier assembly 48 with respect to the connector 46.

In the illustrated embodiment, the seal carrier 130 includes recesses 178 (e.g., recess 180, 182) formed into outer surfaces 184 (e.g., outer surface 186, 188) of the seal carrier 130. As shown, the recess 180 is disposed on a first axial side 190 of the protrusion 162, and the recess 182 is disposed on a second axial side 192 of the protrusion 162. In the illustrated embodiment, the seal carrier 130 includes seal recesses 198 (e.g., seal recess 200, 202) configured to at least partially retain the seals (e.g., seal 132). In the illustrated embodiment, the seal recess 200 is disposed on the first axial side 190, and the seal recess 202 is disposed on the second axial side 192. As shown, the recess 180 is axially disposed between the seal recess 200 and the protrusion 162, and the recess 182 is axially disposed between the seal recess 202 and the protrusion 162. In certain embodiments, the recesses 178 may not be configured to receive a seal (e.g., seal 132).

In the illustrated embodiment, the outer sleeve 90 of the seal carrier tool 80 at least partially encloses the seal carrier assembly 48 to remove (e.g., extract) the seal carrier assembly 48 from the counterbore portion 140 of the borehole 142 of the connector 46. As shown, the seal carrier assembly 48 is at least partially disposed within an interior 204 of the outer sleeve 90. In the illustrated embodiment, the protective bushing 106 engages (e.g., contacts) the axially facing surface 194 of the connector 46. For example, an axially facing surface 205 of the protective bushing 106 contacts (e.g., presses against) the axially facing surface 194 of the connector 46. In certain embodiments, the protective bushing 106 may be detached from the outer sleeve 90. For example, the protective bushing 106 may include an annular layer (e.g., annular pad), decoupled (e.g., separate) from the outer sleeve 90, axially disposed between the connector 46 and the outer sleeve 90.

In the illustrated embodiment, the slot 94 of the inner disk 88 of the seal carrier tool 80 is configured to receive a portion 206 of the seal carrier assembly 48. In the illustrated embodiment, the inner disk 88 engages the seal carrier assembly 48 based on the protrusion 102 of the inner disk 88 engaging (e.g., being inserted into) the seal recess 202 (e.g., after the respective seal is removed). The insertion (e.g., interlocking) of the protrusion 102 into/with the seal recess 202 may facilitate removal of the seal carrier assembly 48, as described in further detail herein. In certain embodiments, the inner disk 88 may include multiple pieces that fit together. In certain embodiments, the seal carrier assembly 48 may engage the inner disk 88 based on an outward radial protrusion of the seal carrier assembly 48 engaging a recess of the inner disk 88.

In the illustrated embodiment, the outer sleeve 90 includes a stopper portion 208 configured to block axial travel of the inner disk 88 in the axial direction 114 relative to the outer sleeve 90. In the illustrated embodiment, the outer sleeve 90 and the stopper portion 208 are a single piece. In certain embodiments, the stopper portion 208 may be a separate piece that is coupled to or engaged with an inner surface 210 of the outer sleeve 90.

In the illustrated embodiment, the seal carrier tool 80 includes the actuator 92 (e.g., actuation device) engaged with (e.g., coupled to) the inner disk 88 and the outer sleeve 90. As shown, the actuator 92 includes a threaded rod 214 having threads 215, a nut 216 having additional threads 217, and a washer 218 axially disposed between the outer sleeve 90 and the nut 216 on the threaded rod 214. The nut 216 is threadedly coupled to the threaded rod 214 via an interlocking of the threads 215 and the additional threads 217. While the actuator 92 includes the threaded rod 214 and the nut 216 in the illustrated embodiment, in certain embodiments the actuator 92 may include other internally and externally threaded components. As shown, the threaded rod 214 is fixedly coupled to the inner disk 88 and slidably coupled to the outer sleeve 90. In the illustrated embodiment, the threaded rod 214 is welded and threaded to the inner disk 88 and inserted through a hole 220 formed in a wall 222 of the outer sleeve 90. As the nut 216 is rotated about the threaded rod 214 (e.g., in the circumferential direction 86), the additional threads 217 of the nut 216 exert a force on the threads 215 of the threaded rod 214 in the axial direction 114, causing the threaded rod 214 to move in the axial direction 114 through the hole 220. As the threaded rod 214 moves in the axial direction 114 through the hole 220, the threaded rod 214 exerts a force on the inner disk 88 in the axial direction 114, causing the inner disk 88 to also move (e.g., translate) in the axial direction 114. The seal carrier assembly 48 may be extracted from the borehole 142 of the connector 46 due to the engagement of the inner disk 88 with the seal carrier assembly 48 via the protrusion 102. For example, as the inner disk 88 moves in the axial direction 114, an axially facing surface 221 of the protrusion 102 of the inner disk 88 may exert a force in the axial direction 114 on an axially facing surface 223 of the seal recess 202, causing the seal carrier assembly 48 to move in the axial direction 114. In certain embodiments, the nut 216 may be rotated by an actuation device. For example, the nut 216 may be rotated by a hydraulic actuator, a pneumatic actuator, a mechanical actuator, an electrical actuator, or any combination thereof. In certain embodiments, the threaded rod 214 may be replaced by a non-threaded (e.g., smooth) rod and the nut 216 may be omitted. For example, the non-threaded rod may be pushed or pulled as part of an actuation device (e.g., hydraulic cylinder, solenoid, etc.).

In the illustrated embodiment, the threaded rod 214 is threaded into a threaded hole 224 formed through a wall 226 of the inner disk 88 via an interlocking of the threads 215 and threads 225 of the threaded hole 224. In the illustrated embodiment, the threaded rod 214 is additionally welded to the inner disk 88. In certain embodiments, the threaded rod 214 may be only threaded to the inner disk 88. In the illustrated embodiment, the threads 215 extend an entire axial extent of the threaded rod 214. In certain embodiments, the threads 215 may extend a partial axial extent of the threaded rod 214. For example, the threads 215 may not extend to the inner disk 88 and an unthreaded portion of the threaded rod 214 may be press fitted or shrink fitted into a non-threaded hole formed through the wall 226 of the inner disk 88. Additionally or alternatively, the threaded rod 214 or, in certain embodiments, an unthreaded portion of the threaded rod may be coupled to the inner disk 88 via other means (e.g., fastener(s), epoxy, weld(s), etc.).

In certain embodiments, the actuator 92 may include a threaded rod (e.g., bolt) threadedly coupled to the inner disk 88 via the threaded hole 224 and rotatably coupled to the outer sleeve 90 (e.g., at the hole 220). The threaded rod may include a head (e.g., bolt head) disposed exterior to the outer sleeve 90 on an axial side 228 of the outer sleeve 90. As the threaded rod is rotated, the threaded rod advances through the threaded hole 224 as the threads of the threaded rod engage the threads 225 of the threaded hole 224, thereby driving the inner disk 88 in the axial direction 114. In certain embodiments, the actuator 92 may include a ratcheting mechanism, a hydraulic actuator, a pneumatic actuator, a mechanical actuator, an electrical actuator, or any combination thereof, in place of or coupled to/with the threaded rod 214.

In the illustrated embodiment, a central axis 232 of the threaded rod 214, the hole 220, and the threaded hole 224 are radially aligned with a central axis 234 of the seal carrier tool 80. In certain embodiments, the central axis 232 of the threaded rod 214 and the hole 220 may be radially offset from the central axis 234 of the seal carrier tool 80. The radial offset of the central axis 232 from the central axis 234 may mitigate circumferential rotation of the inner disk 88 relative to the outer sleeve 90 during actuation of the actuator 92. Additionally or alternatively, the outer sleeve 90 may include a protrusion that extends axially along the inner surface 210 of the outer sleeve 90. The protrusion may engage a recess formed into an outer radial surface 236 of the inner disk 88 to block circumferential rotation of the inner disk 88 relative to the outer sleeve 90 during actuation of the actuator 92. In certain embodiments, the inner disk 88 may include a protrusion extending radially outward from the outer radial surface 236 of the inner disk 88. The protrusion may engage a groove that extends axially along the inner surface 210 of the outer sleeve 90, thereby blocking circumferential rotation of the inner disk 88 relative to the outer sleeve 90. In certain embodiments, the inner disk 88 may include one or more outer flat surfaces (e.g., outer flats) and the outer sleeve 90 may include one or more inner flat surfaces (e.g., inner flats). The outer flat surfaces of the inner disk 88 may be configured to engage the inner flat surfaces of the outer sleeve 90 to block circumferential rotation of the inner disk 88 relative to the outer sleeve 90.

Figure 4:
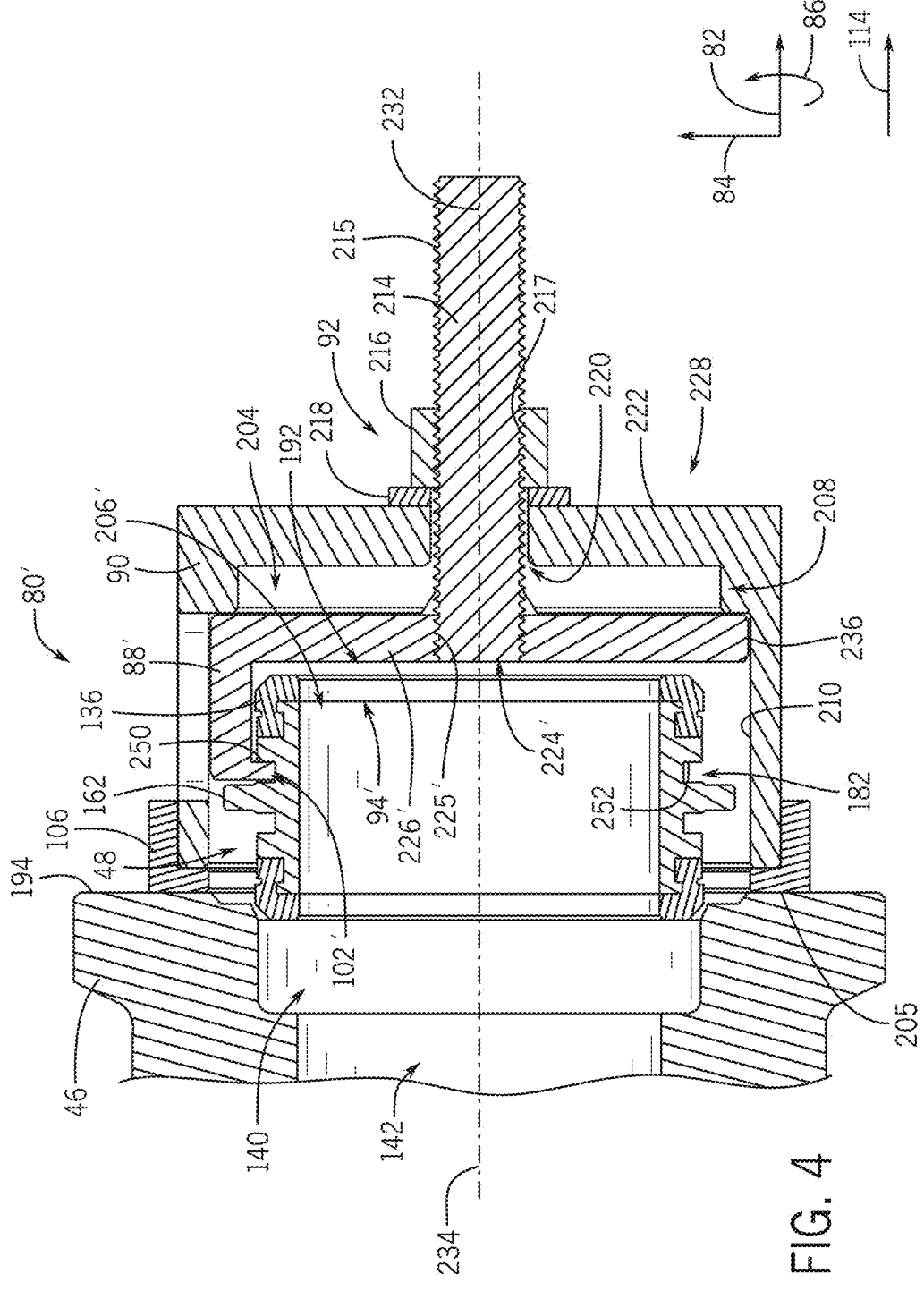
FIG. 4 is a cross-sectional side view of another embodiment of a seal carrier tool for servicing the seal carrier assembly of FIG. 1.

FIG. 4 is a cross-sectional side view of an embodiment of a seal carrier tool 80'. In the illustrated embodiment, except for the addition of the seal 136 to the second axial side 192 of the protrusion 162, the seal carrier assembly 48 is substantially the same as the seal carrier assembly 48 discussed above with respect to FIG. 3. In the illustrated embodiment, the outer sleeve 90 of the seal carrier tool 80' at least partially encloses the seal carrier assembly 48 to remove (e.g., extract) the seal carrier assembly 48 from the counterbore portion 140 of the borehole 142 of the connector 46. As shown, the seal carrier assembly 48 is at least partially disposed within the interior 204 of the outer sleeve 90. In the illustrated embodiment, the protective bushing 106 engages (e.g., contacts) the axially facing surface 194 of the connector 46. For example, the axially facing surface 205 of the protective bushing 106 contacts (e.g., presses against) the axially facing surface 194 of the connector 46. In certain embodiments, the protective bushing 106 may be detached from the outer sleeve 90. For example, the protective bushing 106 may include an annular layer (e.g., annular pad), decoupled (e.g., separate) from the outer sleeve 90, axially disposed between the connector 46 and the outer sleeve 90.

In the illustrated embodiment, a slot 94' of an inner disk 88' of the seal carrier tool 80' is configured to receive a portion 206' of the seal carrier assembly 48. In the illustrated embodiment, the inner disk 88' engages the seal carrier assembly 48 based on a protrusion 102' of the inner disk 88' engaging (e.g., being inserted into) the recess 182. The insertion (e.g., interlocking) of the protrusion 102' into/with the recess 182 may facilitate removal of the seal carrier assembly 48, as described in further detail herein. In the illustrated embodiment, the inner disk 88' is a single piece. In certain embodiments, the inner disk 88' may include multiple pieces that fit together. In certain embodiments, the seal carrier assembly 48 may engage the inner disk 88' based on an outward radial protrusion of the seal carrier assembly 48 engaging a recess of the inner disk 88'.

As previously discussed, the outer sleeve 90 includes a stopper portion 208 configured to block axial travel of the inner disk 88' in the axial direction 114 relative to the outer sleeve 90. In the illustrated embodiment, the outer sleeve 90 and the stopper portion 208 are a single piece. In certain embodiments, the stopper portion 208 may be a separate piece that is coupled to or engaged with an inner surface 210 of the outer sleeve 90.

In the illustrated embodiment, the seal carrier tool 80' includes the actuator 92 (e.g., actuation device) engaged with (e.g., coupled to) the inner disk 88' and the outer sleeve 90. As shown, the actuator 92 includes the threaded rod 214 having the threads 215, the nut 216 having the additional threads 217, and the washer 218 axially disposed between the outer sleeve 90 and the nut 216 on the threaded rod 214. The nut 216 is threadedly coupled to the threaded rod 214 via an interlocking of the threads 215 and the additional threads 217. While the actuator 92 includes the threaded rod 214 and the nut 216 in the illustrated embodiment, in certain embodiments the actuator 92 may include other internally and externally threaded components. As shown, the threaded rod 214 is fixedly coupled to the inner disk 88' and slidably coupled to the outer sleeve 90. In the illustrated embodiment, the threaded rod 214 is welded to the inner disk 88' and inserted through the hole 220 formed in the wall 222 of the outer sleeve 90. As the nut 216 is rotated about the threaded rod 214 (e.g., in the circumferential direction 86), the additional threads 217 of the nut 216 exert a force on the threads 215 of the threaded rod 214 in the axial direction 114, causing the threaded rod 214 to move in the axial direction 114 through the hole 220. As the threaded rod 214 moves in the axial direction 114 through the hole 220, the threaded rod 214 exerts a force on the inner disk 88' in the axial direction 114, causing the inner disk 88' to also move (e.g., translate) in the axial direction 114. The seal carrier assembly 48 may be extracted from the counterbore portion 140 of the borehole 142 of the connector 46 due to the engagement of the inner disk 88' with the seal carrier assembly 48 via the protrusion 102'. For example, as the inner disk 88' moves in the axial direction 114, an axially facing surface 250 of the protrusion 102" of the inner disk 88' may exert a force in the axial direction 114 on an axially facing surface 252 of the recess 182 of the seal carrier assembly 48, thereby causing the seal carrier assembly 48 to move in the axial direction 114. In certain embodiments, the nut 216 may be rotated by an actuation device. For example, the nut 216 may be rotated by a hydraulic actuator, a pneumatic actuator, a mechanical actuator, an electrical actuator, or any combination thereof.

In the illustrated embodiment, the threaded rod 214 is threaded into a threaded hole 224' formed through a wall 226' of the inner disk 88' via an interlocking of the threads 215 and threads 225' of the threaded hole 224'. In the illustrated embodiment, the threaded rod 214 is additionally welded to the inner disk 88'. In certain embodiments, the threaded rod 214 may be only threaded to the inner disk 88'. In the illustrated embodiment, the threads 215 extend an entire axial extent of the threaded rod 214. In certain embodiments, the threads 215 may extend a partial axial extent of the threaded rod 214. For example, the threads 215 may not extend to the inner disk 88' and an unthreaded portion of the threaded rod 214 may be press fitted or shrink fitted into a non-threaded hole formed through the wall 226' of the inner disk 88'. Additionally or alternatively, the threaded rod 214 or an unthreaded portion of the threaded rod may be coupled to the inner disk 88' via other means (e.g., fastener(s), epoxy, weld(s), etc.).

In certain embodiments, the actuator 92 may include a threaded rod (e.g., bolt) threadedly coupled to the inner disk 88' via the threaded hole 224' and rotatably coupled to the outer sleeve 90 (e.g., at the hole 220). The threaded rod may include a head (e.g., bolt head) disposed exterior to the outer sleeve 90 on the axial side 228 of the outer sleeve 90. As the threaded rod is rotated, the threaded rod advances through the threaded hole 224' as the threads of the threaded rod interlock with the threads 225' of the threaded hole 224', thereby driving the inner disk 88' in the axial direction 114. In certain embodiments, the actuator 92 may include a ratcheting mechanism, a hydraulic actuator, a pneumatic actuator, a mechanical actuator, an electrical actuator, or any combination thereof, in place of or coupled to/with the threaded rod 214.

In the illustrated embodiment, the central axis 232 of the threaded rod 214, the hole 220, and the threaded hole 224' are radially aligned with the central axis 234 of the seal carrier tool 80'. In certain embodiments, the central axis 232 of the threaded rod 214 and the hole 220 may be radially offset from the central axis 234 of the seal carrier tool 80'. The radial offset of the central axis 232 from the central axis 234 may mitigate circumferential rotation of the inner disk 88' relative to the outer sleeve 90 during actuation of the actuator 92. Additionally or alternatively, the outer sleeve 90 may include a protrusion that extends axially along the inner surface 210 of the outer sleeve 90. The protrusion may engage a recess formed into an outer radial surface 236' of the inner disk 88' to block circumferential rotation of the inner disk 88' relative to the outer sleeve 90 during actuation of the actuator 92. In certain embodiments, the inner disk 88' may include a protrusion extending radially outward from the outer radial surface 236' of the inner disk 88'. The protrusion may engage a groove that extends axially along the inner surface 210 of the outer sleeve 90, thereby blocking circumferential rotation of the inner disk 88' relative to the outer sleeve 90. In certain embodiments, the inner disk 88' may include one or more outer flat surfaces (e.g., outer flats) and the outer sleeve 90 may include one or more inner flat surfaces (e.g., inner flats). The outer flat surfaces of the inner disk 88' may be configured to engage the inner flat surfaces of the outer sleeve 90 to block circumferential rotation of the inner disk 88' relative to the outer sleeve 90.

Figure 5:
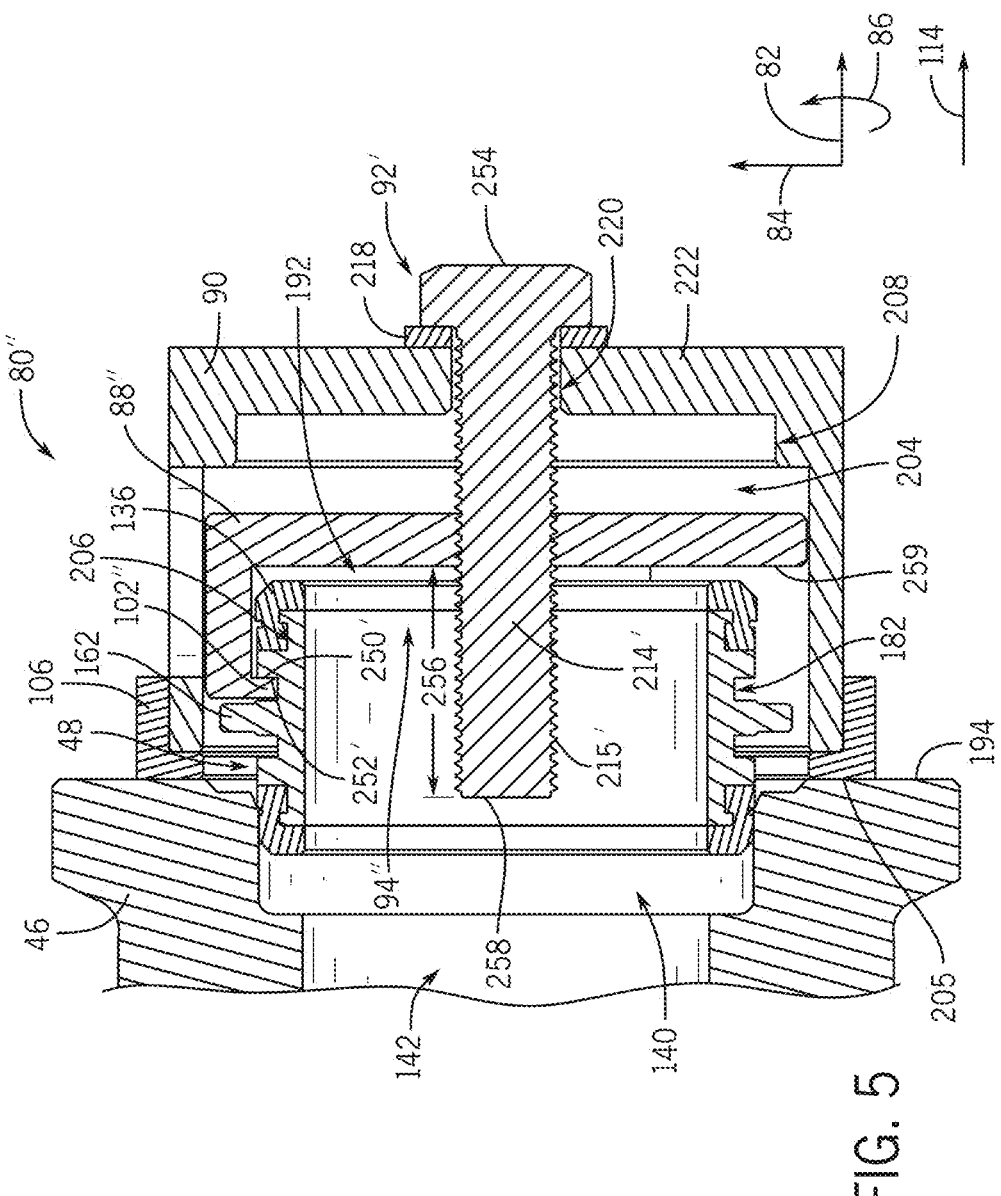
FIG. 5 is a cross-sectional side view of another embodiment of an additional seal carrier tool for servicing the seal carrier assembly of FIG. 1.

FIG. 5 is a cross-sectional side view of an additional seal carrier tool 80" for servicing the seal carrier assembly 48 of FIG. 1. In the illustrated embodiment, except for the addition of the seal 136 to the second axial side 192 of the protrusion 162, the seal carrier assembly 48 is substantially the same as the seal carrier assembly 48 discussed above with respect to FIGS. 3 and 4. In the illustrated embodiment, the outer sleeve 90 of the seal carrier tool 80" at least partially encloses the seal carrier assembly 48 to remove (e.g., extract) the seal carrier assembly 48 from the counterbore portion 140 of the borehole 142 of the connector 46. As shown, the seal carrier assembly 48 is at least partially disposed within the interior 204 of the outer sleeve 90. In the illustrated embodiment, the protective bushing 106 engages (e.g., contacts) the axially facing surface 194 of the connector 46. For example, the axially facing surface 205 of the protective bushing 106 contacts (e.g., presses against) the axially facing surface 194 of the connector 46. In certain embodiments, the protective bushing 106 may be detached from the outer sleeve 90. For example, the protective bushing 106 may include an annular layer (e.g., annular pad), decoupled (e.g., separate) from the outer sleeve 90, axially disposed between the connector 46 and the outer sleeve 90.

In the illustrated embodiment, a slot 94" of an inner disk 88" of the seal carrier tool 80" is configured to receive the portion 206' of the seal carrier assembly 48. In the illustrated embodiment, the inner disk 88" engages the seal carrier assembly 48 based on a protrusion 102" of the inner disk 88" engaging (e.g., being inserted into) the recess 182. The insertion (e.g., interlocking) of the protrusion 102" into/with the recess 182 may facilitate removal of the seal carrier assembly 48, as described in further detail herein. In the illustrated embodiment, the inner disk 88" is a single piece. In certain embodiments, the inner disk 88" may include multiple pieces that fit together. In certain embodiments, the seal carrier assembly 48 may engage the inner disk 88" based on an outward radial protrusion of the seal carrier assembly 48 engaging a recess of the inner disk 88".

As previously discussed, the outer sleeve 90 includes a stopper portion 208 configured to block axial travel of the inner disk 88" in the axial direction 114 relative to the outer sleeve 90. In the illustrated embodiment, the outer sleeve 90 and the stopper portion 208 are a single piece. In certain embodiments, the stopper portion 208 may be a separate piece that is coupled to or engaged with an inner surface 210 of the outer sleeve 90.

In the illustrated embodiment, the seal carrier tool 80" includes an actuator 92' (e.g., actuation device) engaged with (e.g., coupled to) the inner disk 88" and the outer sleeve 90. As shown, the actuator 92' includes a threaded rod 214' having threads 215' and the washer 218 axially disposed between the outer sleeve 90 and a head 254 of the threaded rod 214'. In certain embodiments, the threaded rod 214' may be a bolt or screw. As shown, the threaded rod 214' is threadedly coupled to the inner disk 88" via the threads 215' and rotatably coupled to the outer sleeve 90 through the hole 220 formed in the wall 222 of the outer sleeve 90. As the threaded rod 214' is rotated relative to the outer sleeve 90, the threaded rod 214' exerts a force on the inner disk 88" in the axial direction 114, causing the inner disk 88" to move (e.g., translate) in the axial direction 114. The seal carrier assembly 48 may be extracted from the counterbore portion 140 of the borehole 142 of the connector 46 due to the engagement of the inner disk 88" with the seal carrier assembly 48 via the protrusion 102". For example, as the inner disk 88" moves in the axial direction 114, an axially facing surface 250' of the protrusion 102" of the inner disk 88" may exert a force in the axial direction 114 on an axially facing surface 252' of the recess 182 of the seal carrier assembly 48, thereby causing the seal carrier assembly 48 to move in the axial direction 114. As the inner disk 88" moves in the axial direction 114, a distance 256 between a distal end 258 of the threaded rod 214' and the inner disk 88" (e.g., inner surface 259) increases due to the threaded rod 214' remaining axially stationary as it is rotated relative to the outer sleeve 90. In certain embodiments, the threaded rod 214' may be rotated by a hydraulic actuator, a pneumatic actuator, a mechanical actuator, an electrical actuator, or any combination thereof.

Figure 6:
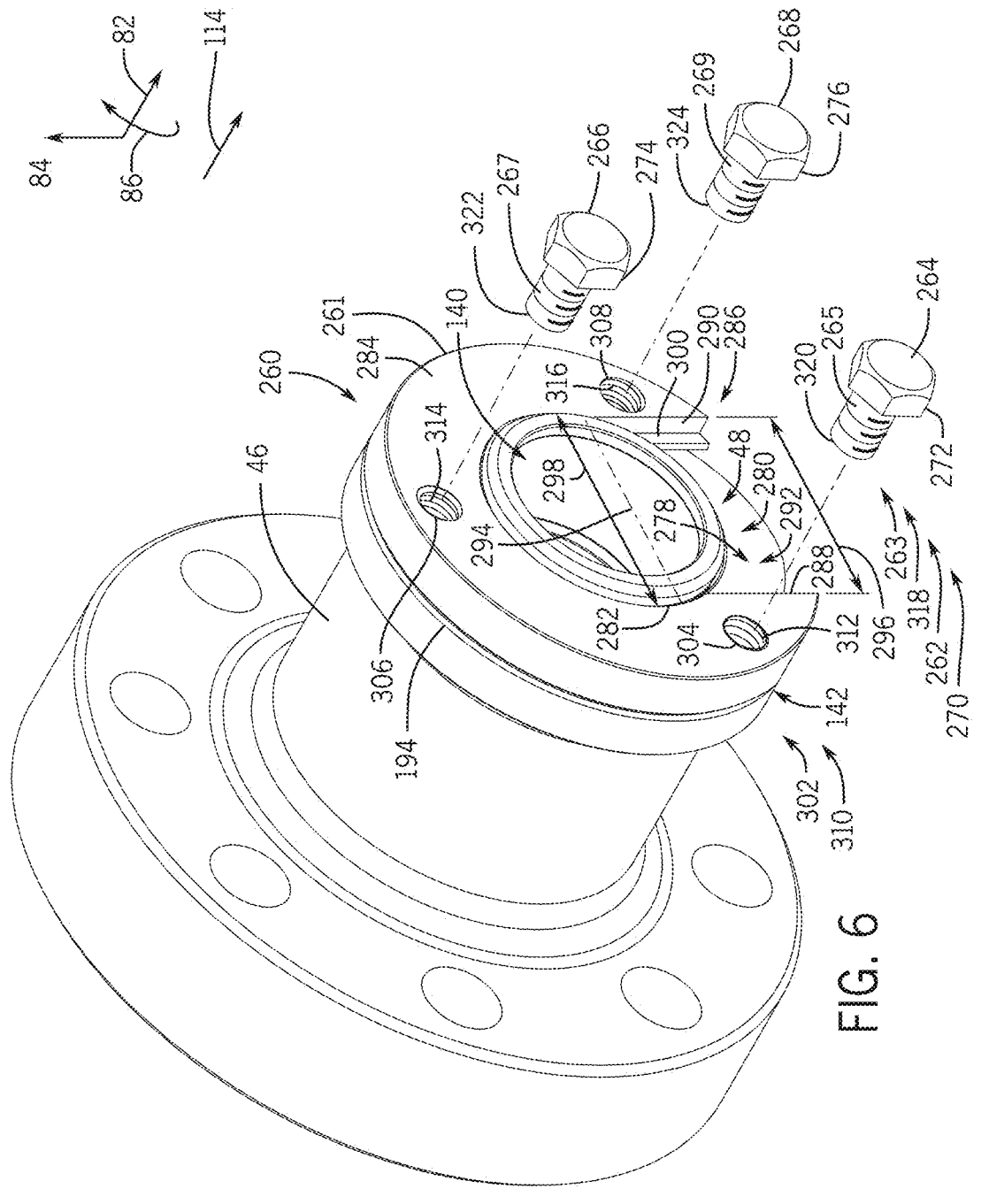
FIG. 6 is a perspective view of an embodiment of an additional seal carrier tool for servicing the seal carrier assembly of FIG. 1.

FIG. 6 is a perspective view of a seal carrier tool 260 for servicing the seal carrier assembly 48. In the illustrated embodiment, the seal carrier tool 260 includes a plate 261 and one or more threaded rods 262 (e.g., threaded rods 264, 266, 268) having corresponding threads 263 (e.g., threads 265, 267, 269) and corresponding heads 270 (e.g., heads 272, 274, 276). In certain embodiments, the heads 270 or the threaded rods 262 may include recesses configured to receive a portion of a tool configured to rotate the threaded rods 262. In certain embodiments, the one or more threaded rods 262 may include one or more bolts. In certain embodiments, the heads 270 may be omitted. In the illustrated embodiment, the plate 261 is adjacent (e.g., axially adjacent) to the connector 46.

In the illustrated embodiment, the plate 261 includes a slot 278 configured to receive a portion 280 of the seal carrier assembly 48. The slot 278 is at least partially defined by an inner radial surface 282 of a wall 284 of the plate 261 and aperture surfaces 286 (e.g., aperture surfaces 288, 290) of an aperture 292 (e.g., notch, opening, hole, etc.) formed radially through the wall 284. In certain embodiments, the aperture surfaces 286 may both substantially intersect a diameter 294 of the inner radial surface 282 and may be substantially tangent to the inner radial surface 282. As shown, a width 296 spanning between the aperture surfaces 286 is greater than a width 298 of the portion 280 of the seal carrier assembly 48.

In the illustrated embodiment, the plate 261 includes a protrusion 300 that extends radially inward from the inner radial surface 282 of the radial wall 284 and extends inwardly from the aperture surfaces 286. The protrusion 300 may engage a recess (e.g., recess 182, seal recess 202) of the seal carrier assembly 48 to facilitate removal of the seal carrier assembly 48 from the counterbore portion 140 of the borehole 142 of the connector 46. In certain embodiments, the plate 261 may include a recess formed into the inner radial surface 282 and/or an aperture surface 286, and the seal carrier assembly 48 may include a protrusion configured to be received by the recess. In the illustrated embodiment, the protrusion 300 is a single contiguous protrusion. In certain embodiments, the protrusion 300 may include multiple protrusions circumferentially spaced about the inner radial surface 282 and/or along the aperture surfaces 286.

In the illustrated embodiment, the plate 261 includes one or more threaded holes 302 (e.g., threaded hole 304, 306, 308) having corresponding hole threads 310 (e.g., hole threads 312, 314, 316) formed through the plate 261. The threaded rods 262 are configured to threadedly couple to the threaded holes 302 via an interlocking of the threads 263 with the hole threads 310. Based on rod ends 318 (e.g., rod end 320, 322, 324) of the corresponding threaded rods 262 passing through the threaded holes 302, the rod ends 318 contact (e.g., press against) the axially facing surface 194 of the connector 46. As threading of the threaded rods 262 continues, the connector 46 exerts a force onto the threaded rods 262 in the axial direction 114. The force is transferred from the threads 263 to the hole threads 310, causing the plate 261 to move in the axial direction 114. The force is further transferred from the plate 261 to the seal carrier assembly 48 via the engagement between the protrusion 300 and a recess of the seal carrier assembly 48, causing the seal carrier assembly 48 to move in the axial direction 114, thereby facilitating removal of the seal carrier assembly 48 from the counterbore portion 140 of the borehole 142.

In the illustrated embodiment, the threaded rods 262 are configured to engage the axially facing surface 194 of the connector 46 via direct contact. In certain embodiments, a protective layer may be disposed between the connector 46 and the plate segments 350. The threaded rods 262 may contact (e.g., press against) the protective layer and engage the axially facing surface 194 of the connector 46 via indirect contact, thereby mitigating potential wear (e.g., scuffs) on the axially facing surface 194. In certain embodiments, the threaded rods 262 may be composed of a metal (e.g., aluminum) or metallic alloy (e.g., steel, bronze, etc.).

Figure 7:
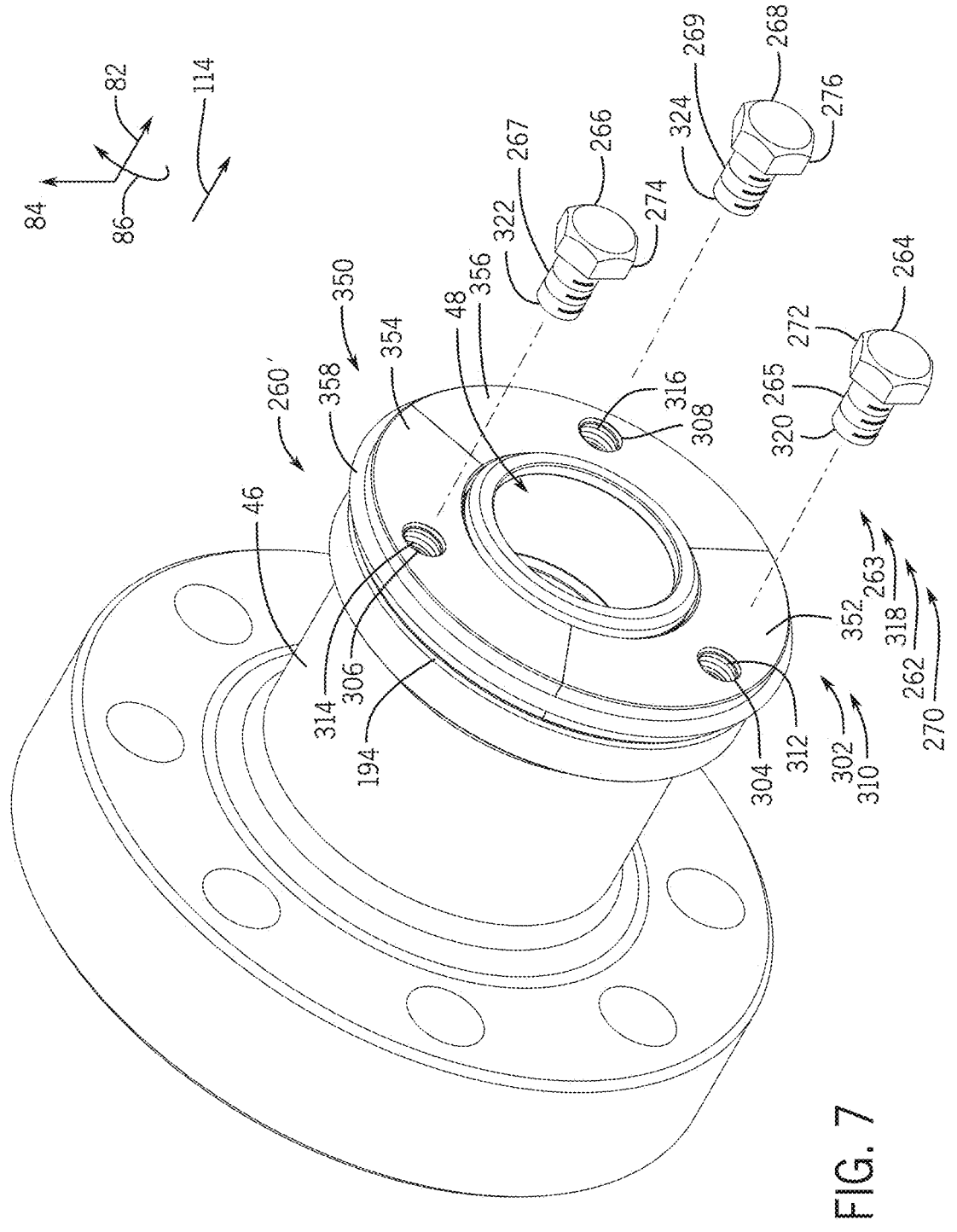
FIG. 7 is a perspective view of another embodiment of a seal carrier tool for servicing the seal carrier assembly of FIG. 1.

FIG. 7 is a perspective view of an embodiment of a seal carrier tool 260' for servicing the seal carrier assembly 48. In the illustrated embodiment, the seal carrier tool 260' includes multiple plate segments 350 (e.g., plate segments 352, 354, 356) and the corresponding threaded rods 262 (e.g., threaded rods 264, 266, 268) having the corresponding threads 263 (e.g., threads 265, 267, 269) and the corresponding heads 270 (e.g., heads 272, 274, 276). In certain embodiments, the one or more threaded rods 262 may include one or more bolts. In the illustrated embodiment, the plate segments 350 are adjacent (e.g., axially adjacent) to the connector 46. In certain embodiments, the heads 270 or the threaded rods 262 may include recesses configured to receive a portion of a tool configured to rotate the threaded rods 262. In certain embodiments, the one or more heads 270 may be omitted.

In the illustrated embodiment, the seal carrier tool 260' also includes an elastomeric ring 358 circumferentially disposed about the plate segments 350 and configured to at least partially secure the plate segments 350 radially about the seal carrier assembly 48. In the illustrated embodiment, the seal carrier tool 260' includes three plate segments 350 and corresponding threaded rods 262. In certain embodiments, the seal carrier tool 260' may include fewer or more plate segments 350 and corresponding threaded rods 262. For example, the seal carrier tool 260' may include 2, 4, 5, 6, or more plate segments 350 and corresponding threaded rods 262. In certain embodiments, different plate segments 350 may include 2, 3, 4, or more threaded holes 202. In certain embodiments, a plate segment 350 may not include a threaded hole 302. In certain embodiments, different plate segments 350 may include different numbers of threaded holes 202.

In the illustrated embodiment, the plate segments 350 include corresponding threaded holes 302 (e.g., threaded hole 304, 306, 308) having corresponding hole threads 310 (e.g., hole threads 312, 314, 316) formed through the respective plate segments 350. The threaded rods 262 are configured to threadedly couple to the threaded holes 302 via an interlocking of the threads 263 with the hole threads 310. Based on the rod ends 318 (e.g., rod end 320, 322, 324) of the corresponding threaded rods 262 passing through the threaded holes 302, the rod ends 318 contact (e.g., press against) the axially facing surface 194 of the connector 46. As threading of the threaded rods 262 continues, the connector 46 exerts a force onto the threaded rods 262 in the axial direction 114. The force is transferred from the threads 263 to the hole threads 310, causing the plate segments 350 to move in the axial direction 114. The force is further transferred from the plate segments 350 to the seal carrier assembly 48 via the engagement between the protrusion 300 and a recess of the seal carrier assembly 48, causing the seal carrier assembly 48 to move in the axial direction 114, thereby facilitating removal of the seal carrier assembly 48 from the counterbore portion 140 of the borehole 142.

In the illustrated embodiment, the threaded rods 262 are configured to engage the axially facing surface 194 of the connector 46 via direct contact. In certain embodiments, a protective layer may be disposed between the connector 46 and the plate segments 350. The threaded rods 262 may contact (e.g., press against) the protective layer and engage the axially facing surface 194 of the connector 46 via indirect contact, thereby mitigating potential wear (e.g., scuffs) on the axially facing surface 194. In certain embodiments, the threaded rods 262 may be composed of a metal (e.g., aluminum) or metallic alloy (e.g., steel, bronze, etc.).

Figure 8:
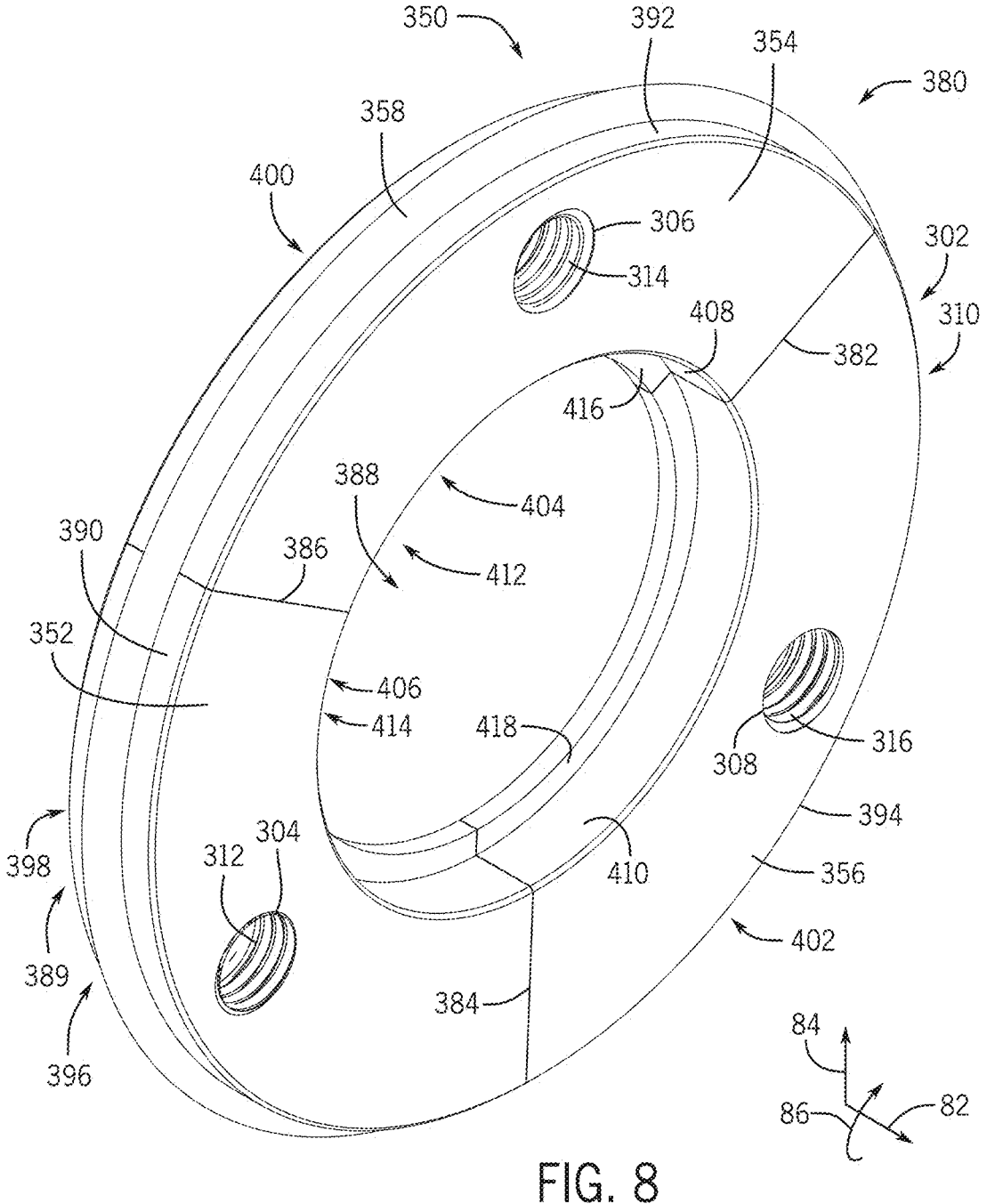
FIG. 8 is a perspective view of plate segments of the seal carrier tool of FIG. 7.

FIG. 8 is a perspective view of the plate segments 350 (e.g., plate segments 352, 354, 356) of the seal carrier tool 260' of FIG. 7. In the illustrated embodiment, the plate segments 350 are circumferentially joined together at circumferential interfaces 380 (e.g., circumferential interfaces 382, 384, 386). The joined plate segments 350 form an aperture 388 (e.g., hole, circular aperture, circular hole). In the illustrated embodiment, the plate segments 350 have a substantially equivalent shape and size. In certain embodiments, the plate segments 350 may have different shapes, sizes, and/or thicknesses. As previously discussed, the plate segments 350 include the corresponding threaded holes 302 (e.g., threaded hole 304, 306, 308) having the corresponding hole threads 310 (e.g., hole threads 312, 314, 316) formed through the respective plate segments 350. In the illustrated embodiment, each plate segment 350 includes a single threaded hole 302. In certain embodiments, different plate segments 350 may include 2, 3, 4, or more threaded holes 202. In certain embodiments, a plate segment 350 may not include a threaded hole 302. In certain embodiments, different plate segments 350 may include different numbers of threaded holes 202.

In the illustrated embodiment, the elastomeric ring 358 is circumferentially disposed about the plate segments 350 and configured to at least partially secure the plate segments 350 radially about the seal carrier assembly 48. In the illustrated embodiment, outer radial surfaces 389 (e.g., outer radial surface 390, 392, 394) of the corresponding plate segments 350 may form respective corresponding grooves 396 (e.g., groove 398, 400, 402) configured to receive and at least partially retain the elastomeric ring 358. In certain embodiments, the elastomeric ring 358 may be omitted, and the plate segments 350 may be joined together using a clamp around the perimeter or circumference of the segments (e.g., hose clamp). In certain embodiments, the clamp segments (e.g., adjacent segments) may be fastened (e.g., coupled) together via fasteners (e.g. socket head screws, pins, latches, etc.) or other coupling methods. For example, the clamp segments may be joined together via adhesion (mechanical or chemical), magnetic fasteners (e.g., permanent magnets), or the like.

In the illustrated embodiment, the plate segments 350 form respective inner surfaces 404 (e.g., inner surface 406, 408, 410), and respective protrusions 412 (e.g., protrusion 414, 416, 418) extend inward (e.g., radially inward) from the inner surfaces 404. In the illustrated embodiment, the protrusions 412 (e.g., lips, pins, etc.) are axially aligned with one another. The protrusions 412 may engage a recess of the seal carrier assembly to facilitate removal of the seal carrier assembly from the counterbore portion of the borehole of the connector. For example, the protrusions 412 may engage the recess 182 or the seal recess 202 shown in FIG. 4. In certain embodiments, the inner surfaces 404 may form respective recesses, and the seal carrier assembly 48 may include a protrusion configured to be received by the recesses. In the illustrated embodiment, the protrusions 412 form a contiguous protrusion when the plate segments 350 are joined together. In certain embodiments, the protrusions 412 may be circumferentially separated by gaps, such that the protrusions 412 form multiple protrusions when the plate segments 350 are joined together.

FIG. 9 is a flowchart of an example process 440 for operating the seal carrier tool 80 of FIGS. 2 and 3, as well as the seal carrier tool 80' of FIG. 4. The blocks of the process 440 may be performed in the order disclosed herein or in any other suitable order. For example, certain blocks of the process 440 may be performed concurrently. In addition, in certain embodiments, at least one of the blocks of the process 440 may be omitted.

In block 442 of the process 440, the inner disk 88 of the seal carrier tool 80 engages the seal carrier assembly 48. For example, the protrusion 102 of the inner disk 88 may engage the seal recess 202 of the seal carrier assembly 48. The inner disk 88 is disposed within the outer sleeve 90 of the seal carrier tool 80. Alternatively, the inner disk 88' of the seal carrier tool 80' may engage the seal carrier assembly 48. For example, the protrusion 102' of the inner disk 88' may engage the recess 182 of the seal carrier assembly 48. The inner disk 88' is disposed within the outer sleeve 90 of the seal carrier tool 80'. The seal carrier assembly 48 is configured to removably engage (e.g., removably couple to) the counterbore portion 140 (e.g., portion) of the borehole 142 of the connector 46 of the fluid supply system 12.

In block 444 of the process 440, the outer sleeve 90 of the seal carrier tool 80 engages with the connector 46. For example, the axially facing surface 205 of the protective bushing 106 of the seal carrier tool 80 may contact (e.g., press against) the axially facing surface 194 of the connector 46. Alternatively, the outer sleeve 90 of the seal carrier tool 80' may engage with the connector 46. For example, the axially facing surface 205 of the protective bushing 106 of the seal carrier tool 80' may contact (e.g., press against) the axially facing surface 194 of the connector 46. In certain embodiments, a protective layer may be disposed axially between the connector 46 and the seal carrier tool 80 or the seal carrier tool 80'.

In block 446 of the process 440, the actuator 92 of the seal carrier tool 80 is actuated to move the inner disk 88 in the axial direction 114 relative to the outer sleeve 90. For example, the actuator 92 may be actuated based on rotating the nut 216 of the actuator 92 circumferentially about the threaded rod 214 of the actuator 92, thereby causing the threaded rod 214 and the inner disk 88 to move in the axial direction 114. Alternatively, the actuator 92 of the seal carrier tool 80' may be actuated to move the inner disk 88' in the axial direction 114 relative to the outer sleeve 90. For example, the actuator 92 may be actuated based on rotating the nut 216 of the actuator 92 circumferentially about the threaded rod 214 of the actuator 92, thereby causing the threaded rod 214 and the inner disk 88' to move in the axial direction 114. In certain embodiments, the nut 216 may be rotated via a pneumatic actuator, a hydraulic actuator, a mechanical actuator, an electrical actuator, or any combination thereof.

In block 448 of the process 440, the seal carrier assembly 48 is removed (e.g., extracted) from the counterbore portion 140 of the borehole 142 based on actuation of the actuator 92. For example, the seal carrier assembly 48 may be extracted from the borehole 142 of the connector 46 due to an axially facing surface of the protrusion 102 of the inner disk 88 of the seal carrier tool 80 exerting a force in the axial direction 114 on an axially facing surface of a seal recess 202 of the seal carrier assembly 48. Alternatively, the seal carrier assembly 48 may be extracted from the counterbore portion 140 of the borehole 142 of the connector 46 due to an axially facing surface of the protrusion 102' of the inner disk 88' of the seal carrier tool 80' exerting a force in the axial direction 114 on an axially facing surface of a recess 182 of the seal carrier assembly 48.

In any of the above embodiments disclosed in FIGS. 1-9, the counterbore portion 140 of the borehole 142 may be omitted and the seal carrier assembly 48 may be disposed in the borehole 142. Additionally, the above embodiments may be configured to remove the seal carrier assembly 48 from the borehole 142.

While only certain features have been illustrated and described herein, many modifications and changes will occur to those skilled in the art. It is, therefore, to be understood that the appended claims are intended to cover all such modifications and changes as fall within the true spirit of the disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A system, comprising:
   a seal carrier tool, comprising:
   an inner portion configured to engage a seal carrier assembly, wherein the seal carrier assembly is configured to removably engage with a portion of a borehole of a connector of a fluid supply system;

an outer portion disposed radially outward from the inner portion, wherein the outer portion is configured to engage the connector; and an actuator configured to engage both the inner portion and the outer portion;

wherein the actuator is configured to drive the inner portion to move in an axial direction relative to the outer portion to facilitate removal of the seal carrier assembly from the portion of the borehole.

2. The system of claim 1, wherein the inner portion comprises a protrusion configured to engage a recess of the seal carrier assembly.

3. The system of claim 1, comprising the seal carrier assembly.

4. The system of claim 3, wherein the seal carrier assembly comprises a recess.

5. The system of claim 4, wherein the inner portion comprises a protrusion configured to engage the recess.

6. The system of claim 5, wherein the recess is configured to receive a seal of the seal carrier assembly.

7. The system of claim 5, wherein the recess is not configured to receive a seal of the seal carrier assembly.

8. The system of claim 1, wherein the inner portion comprises a slot at least partially defined by an aperture formed through a wall of the inner portion.

9. The system of claim 8, wherein the inner portion is configured to engage the seal carrier assembly based on the slot receiving a portion of the seal carrier assembly.

10. The system of claim 1, wherein the outer portion comprises a slot formed through a wall of the outer portion, the slot extends along the axial direction, and the slot is configured to provide visibility of a portion of the inner portion from an exterior of the seal carrier tool.

11. The system of claim 1, wherein the actuator comprises:

an externally threaded component fixedly coupled to the inner portion and slidably coupled to the outer portion; and an internally threaded component threaded to the externally threaded component and disposed exterior to the outer portion.

12. The system of claim 1, wherein the actuator comprises an externally threaded component rotatably coupled to the outer portion and threadedly coupled to the inner portion to drive the inner portion in the axial direction based on a rotation of the externally threaded component.

13. A method, comprising:

engaging a seal carrier assembly with an inner portion of a seal carrier tool, wherein the seal carrier assembly is configured to removably engage with a portion of a borehole of a connector of a fluid supply system, and the inner portion of the seal carrier tool is disposed within an outer portion of the seal carrier tool;

engaging the connector with the outer portion of the seal carrier tool;

actuating an actuator coupled to both the inner portion and the outer portion to move the inner portion in an axial direction relative to the outer portion; and removing the seal carrier assembly from the portion of the borehole based on the actuation of the actuator.

14. The method of claim 13, wherein engaging the seal carrier assembly comprises receiving a portion of the seal carrier assembly into a slot of the inner portion, wherein the slot is at least partially defined by an aperture formed through a wall of the inner portion.

15. A seal carrier tool, comprising:

a tool portion configured to engage a seal carrier assembly, wherein the seal carrier assembly is configured to removably engage with a portion of a borehole of a connector of a fluid supply system;

an additional tool portion, wherein at least a portion of the additional tool portion is radially offset from the tool portion, and the additional tool portion is configured to engage the connector; and an actuator configured to engage both the tool portion and the additional tool portion;

wherein the actuator is configured to drive the tool portion to move in an axial direction relative to the additional tool portion to facilitate removal of the seal carrier assembly from the portion of the borehole.

16. The seal carrier tool of claim 15, wherein the tool portion comprises a protrusion configured to engage a recess of the seal carrier assembly.

17. The seal carrier tool of claim 15, wherein the tool portion comprises a slot at least partially defined by an aperture formed through a wall of the tool portion.

18. The seal carrier tool of claim 17, wherein the tool portion is configured to engage the seal carrier assembly based on the slot receiving a portion of the seal carrier assembly.

19. The seal carrier tool of claim 15, wherein the additional tool portion comprises a slot formed through a wall of the additional tool portion, the slot extends along the axial direction, and the slot is configured to provide visibility of a portion of the tool portion from an exterior of the seal carrier tool.

20. The seal carrier tool of claim 15, wherein the actuator comprises:

an externally threaded component fixedly coupled to the tool portion and slidably coupled to the additional tool portion; and an internally threaded component threaded to the externally threaded component and disposed exterior to the additional tool portion.

\* \* \* \* \*